(12) United States Patent
Bang et al.

(10) Patent No.: US 12,255,473 B2
(45) Date of Patent: Mar. 18, 2025

(54) MOBILE DEVICE AND OPERATING METHOD THEREOF

(71) Applicant: Samsung Electronics Co., Ltd., Suwon-si (KR)

(72) Inventors: Sangun Bang, Seongnam-si (KR); Duseung Oh, Hwaseong-si (KR); Youngsoo Lee, Anyang-si (KR); Dongjo Kim, Suwon-si (KR); Dongjoon Kim, Seoul (KR); Sungeun Lee, Hwaseong-si (KR); Jinsoo Lee, Hwaseong-si (KR); Woonhyung Heo, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 193 days.

(21) Appl. No.: 17/315,807

(22) Filed: May 10, 2021

(65) Prior Publication Data
US 2022/0060033 A1 Feb. 24, 2022

(30) Foreign Application Priority Data

Aug. 21, 2020 (KR) ......................... 10-2020-0105534

(51) Int. Cl.
*H02J 7/00* (2006.01)
*H02J 50/10* (2016.01)
*H04R 1/10* (2006.01)

(52) U.S. Cl.
CPC .......... *H02J 7/0031* (2013.01); *H02J 7/0048* (2020.01); *H02J 50/10* (2016.02); *H04R 1/1025* (2013.01); *H04R 1/1041* (2013.01); *H04R 2420/07* (2013.01)

(58) Field of Classification Search
CPC ........................................................ H02J 7/00
See application file for complete search history.

(56) References Cited

U.S. PATENT DOCUMENTS

| 6,995,963 | B2 | 2/2006 | Fadell et al. |
| 8,237,414 | B1 | 8/2012 | Li et al. |
| 8,461,807 | B2 | 6/2013 | Senriuchi et al. |

(Continued)

FOREIGN PATENT DOCUMENTS

| JP | 2009-027479 A | 2/2009 |
| JP | 2010-041303 A | 2/2010 |

(Continued)

OTHER PUBLICATIONS

Notice of Allowance, dated Jul. 10, 2024, issued in U.S. Appl. No. 18/299,377.

(Continued)

*Primary Examiner* — Robert Grant
(74) *Attorney, Agent, or Firm* — Harness, Dickey & Pierce, P.L.C.

(57) ABSTRACT

A mobile system includes a first mobile device configured to output a signal having a level less than or equal to a reference level on the basis of a charged state of a battery in the first mobile device and a second mobile device configured to receive the signal and to selectively provide power to the first mobile device on the basis of a duration time for which a level of the signal is maintained to be less than or equal to the reference level and a toggle time for which the signal is toggled.

20 Claims, 14 Drawing Sheets

(56) References Cited

U.S. PATENT DOCUMENTS

| | | |
|---|---|---|
| 9,130,659 B2 | 9/2015 | Nii et al. |
| 9,197,100 B2 | 11/2015 | Ichikawa |
| 9,312,576 B2 | 4/2016 | Hung et al. |
| 9,466,860 B2 | 10/2016 | Noda et al. |
| 9,843,853 B2 | 12/2017 | Hirsch et al. |
| 10,104,463 B2 | 10/2018 | Kim et al. |
| 10,560,576 B1 | 2/2020 | Kim et al. |
| 2004/0109499 A1 | 6/2004 | Cern |
| 2004/0113587 A1 | 6/2004 | Bohne et al. |
| 2008/0049606 A1 | 2/2008 | Rhelimi et al. |
| 2008/0246433 A1 | 10/2008 | Kim et al. |
| 2009/0184688 A1 | 7/2009 | Kim et al. |
| 2010/0026247 A1 | 2/2010 | Kim |
| 2010/0039066 A1 | 2/2010 | Yuan et al. |
| 2010/0175094 A1 | 7/2010 | Ono |
| 2011/0221604 A1 | 9/2011 | Johnson |
| 2013/0038274 A1 | 2/2013 | Forsythe |
| 2013/0320947 A1 | 12/2013 | Noh et al. |
| 2014/0306660 A1 | 10/2014 | Suzuki et al. |
| 2014/0333262 A1 | 11/2014 | Ochiai et al. |
| 2015/0326969 A1 | 11/2015 | Tu et al. |
| 2015/0365132 A1 | 12/2015 | Yu |
| 2016/0006292 A1* | 1/2016 | Hatanaka ............. H02J 7/0042 320/108 |
| 2016/0080141 A1 | 3/2016 | Theiler et al. |
| 2017/0093454 A1 | 3/2017 | Chawan et al. |
| 2017/0166073 A1 | 6/2017 | Park |
| 2018/0248414 A1 | 8/2018 | Liu et al. |
| 2018/0312072 A1 | 11/2018 | Yang et al. |
| 2019/0075385 A1 | 3/2019 | Lee et al. |
| 2019/0098396 A1 | 3/2019 | Shin et al. |
| 2019/0289382 A1 | 9/2019 | Chawan et al. |
| 2020/0052526 A1 | 2/2020 | Ueda |

FOREIGN PATENT DOCUMENTS

| | | |
|---|---|---|
| JP | 2015-076954 A | 4/2015 |
| JP | 2019-220882 A | 12/2019 |
| KR | 10-2018-0093322 A | 8/2018 |
| KR | 10-2071268 B1 | 1/2020 |
| KR | 10-2020-0016636 A | 2/2020 |

OTHER PUBLICATIONS

Final Office Action, dated Sep. 17, 2024, issued in U.S. Appl. No. 17/315,834.

Korean Office Action, dated Jan. 13, 2025, issued in Korean Patent Application No. 10-2020-0105535.

* cited by examiner

FIG. 7

| START/RELEASE CONDITION | OVER-DISCHARGE PROTECTION START | OVER-DISCHARGE PROTECTION RELEASE |
|---|---|---|
| CONDITION | VrBAT < Vref | Vref2 ≤ VrBAT |
| EN1 | LOW | HIGH |
| EN2 | HIGH | HIGH |

MOBILE DEVICE AND OPERATING METHOD THEREOF

CROSS-REFERENCE TO RELATED APPLICATION

This application is based on and claims priority under 35 U.S.C. § 119 to Korean Patent Application No. 10-2020-0105534, filed on Aug. 21, 2020, in the Korean Intellectual Property Office, the disclosure of which is incorporated by reference herein in its entirety.

BACKGROUND

The inventive concepts relate to a mobile device, and more particularly, to a mobile device and an operating method thereof.

Wireless earphones are devices which output a sound in response to a source signal received wirelessly. The wireless earphones include, for example, a communication module such as a Bluetooth module, for performing close-distance wireless communication, and a battery for supplying driving power to the communication module. Dedicated charge devices for charging batteries of wireless earphones include a charge case for keeping the wireless earphones and charging the batteries of the wireless earphones.

SUMMARY

The inventive concepts provide a method for data transmission and reception between wireless earphones and a charge case.

The inventive concepts provide a mobile device capable of determining a charging state of a battery included in an external device on the basis of a signal received from the external device, and an operation method of the mobile device.

According to an aspect of the inventive concepts, there is provided a mobile system including a first mobile device configured to output a signal having a level less than or equal to a reference level on the basis of a charged state of a battery, the first mobile device including the battery, and a second mobile device configured to receive the signal and to selectively provide power to the first mobile device on the basis of a duration time for which a level of the signal is maintained to be less than or equal to the reference level and a toggle time for which the signal is toggled.

According to another aspect of the inventive concepts, there is provided a mobile device including a connection terminal configured to receive a signal from an external device including a battery, a power management integrated circuit configured to generate power to be provided to the external device, and a control circuit configured to control the power management integrated circuit so that the power is provided to the external device, based on a duration time for which a level of the signal is maintained to be less than or equal to than a reference level and a toggle time for which the signal is toggled.

According to another aspect of the inventive concepts, there is provided an operating method of a mobile device capable of providing power to an external device including a battery, the operating method including receiving, from the external device, a signal having a level less than or equal to a reference level, determining a charged state of the battery on the basis of a duration time for which reception of the signal having the level less than or equal to the reference level is maintained and a toggle time for which the signal is toggled, and selectively providing power to the external device on the basis of the determined charged state.

BRIEF DESCRIPTION OF THE DRAWINGS

Example embodiments of the inventive concepts will be more clearly understood from the following detailed description taken in conjunction with the accompanying drawings in which:

FIG. 7 is a diagram of an operation of a protection circuit module performing an over-discharge protection function;

DETAILED DESCRIPTION

Hereinafter, various example embodiments will be described with reference to the accompanying drawings.

Figure 1:
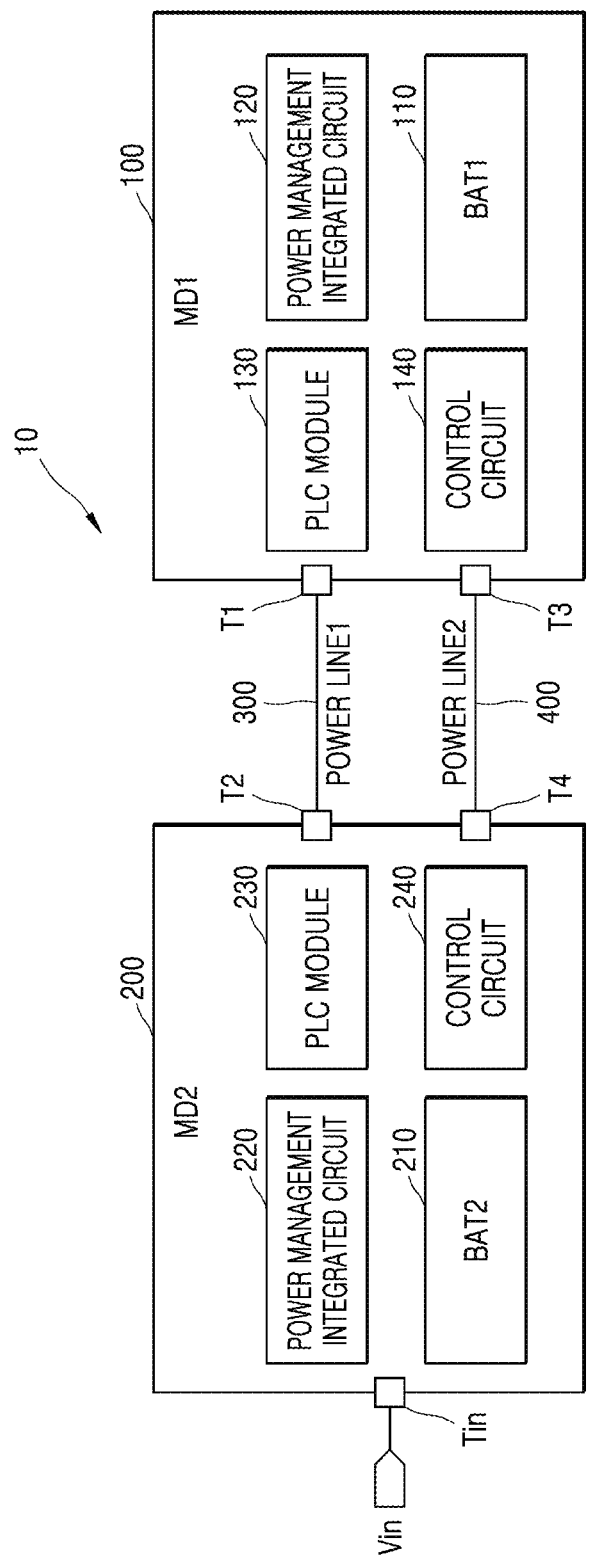
FIG. 1 illustrates a mobile system according to example embodiments.

FIG. 1 illustrates a mobile system 10 according to example embodiments. Referring to FIG. 1, the mobile system 10 may include a first mobile device (MD1) 100 and a second mobile device (MD2) 200, and the first mobile device 100 may be electrically connected to the second mobile device 200 through a first power line 300 and a second power line 400. The first mobile device 100 and the second mobile device 200 may transmit and receive power or data therebetween through the first and second power lines 300 and 400, thereby performing power line communication (PLC). The first mobile device 100 may include first and third connection terminals T1 and T3 electrically connectable to the second mobile device 200 and may receive power from the second mobile device 200 or may transmit or receive data to or from the second mobile device 200 through the first and third connection terminals T1 and T3. Likewise, the second mobile device 200 may include second and fourth connection terminals T2 and T4 electrically connectable to the first mobile device 100 and may supply the power to the first mobile device 100 or may transmit or receive the data to or from the first mobile device 100 through the second and fourth connection terminals T2 and T4. The first connection terminal T1 may be electrically connected to the second connection terminal T2 through the first power line 300, and the third connection terminal T3 may be electrically connected to the fourth connection terminal T4 through the second power line 400. The first power line 300 may be a line for transferring a positive voltage or a positive current, or the second power line 400 may be a line for transferring a negative voltage or a negative current. However, the number of power lines and a voltage and a current each transferred through each of the power lines are not limited thereto. Hereinafter, for convenience of description, description will be given by using only the first power line 300, and the first power line 300 may be referred to as a power line 300. However, it may be obviously understood that a description of the first power line 300 may be applied to the second power line 400.

The PLC may be communication technology for transmitting power and data through a power line. For example, the first power line 300 may be implemented based on an electrical connection between the first and second connection terminals T1 and T2, and the first and second mobile devices 100 and 200 may transmit and receive power and data therebetween through the power line 300. The first mobile device 100 may not include a separate connection terminal or connection pin for performing data communication with the second mobile device 200 and may perform the data communication with the second mobile device 200 through the first connection terminal T1 Likewise, the second mobile device 200 may not include a separate connection terminal or connection pin for performing data communication with the first mobile device 100 and may perform the data communication with the first mobile device 100 through the second connection terminal T2. Therefore, a size of each of the first and second mobile devices 100 and 200 may be miniaturized.

The first mobile device 100 may include a first battery (BAT1) 110, a power management integrated circuit 120, a PLC module 130, and/or a control circuit 140. A charged state of the first battery 110 may include an over-discharged state, a normal state, and a fully-charged state. For example, when a charged voltage of the first battery 110 is lower than a pre-charge voltage Vpre, the first battery 110 may be in the over-discharged state, and when the charged voltage of the first battery 110 is higher than a fully-charged voltage Vfc, the first battery 110 may be in the fully-charged state. Also, when the charged voltage of the first battery 110 is higher than the pre-charge voltage Vpre and lower than the fully-charged voltage Vfc, the first battery 110 may be in the normal state. The fully-charged voltage Vfc may be higher than the pre-charge voltage Vpre.

The power management integrated circuit 120 may charge the first battery 110 by using different schemes on the basis of a charged state of the first battery 110. For example, as a charged voltage of a battery increases, the power management integrated circuit 120 may charge the first battery 110 by using a pre-charge scheme, a constant-current scheme, a constant-voltage scheme, or a trickle charge scheme. When the first battery 110 is in the over-discharged state, the power management integrated circuit 120 may charge the first battery 110 by using the pre-charge scheme, and when the first battery 110 is in the normal state, the power management integrated circuit 120 may charge the first battery 110 by using the constant-current scheme and the constant-charge scheme. When the first battery 110 is in the fully-charged state, the power management integrated circuit 120 may charge the first battery 110 by using the trickle charge scheme. A charge scheme will be described in more detail with reference to FIG. 5.

The PLC module 130 may receive power from the second mobile device 200 or may transmit or receive data to or from the second mobile device 200, based on control by the control circuit 140. For example, the PLC module 130 may modulate a voltage signal or a current signal, which is to be output through the first connection terminal T1, and may demodulate the voltage signal and the current signal each received through the first connection terminal T1. For example, the first mobile device 100 may include a current source, a current modulator, and a voltage demodulator, and thus, may receive data through demodulation of the voltage signal and may transmit data through modulation of the current signal.

In example embodiments, the first mobile device 100 may be a device which does not support PLC-based communication. For example, the first mobile device 100 may not include the PLC module 130. When the first mobile device 100 does not include the PLC module 130, the first mobile device 100 may perform only a charge operation of receiving power from the second mobile device 200. In FIGS. 2 to 9, an example where the first mobile device 100 does not include the PLC module 130 will be described below, but it may be obviously understood that descriptions of FIGS. 2 to 9 may be applied to the first mobile device 100 including the PLC module 130.

The control circuit 140 may control an overall operation of the first mobile device 100. For example, the control circuit 140 may control a communication operation performed on the second mobile device 200 by controlling the PLC module 130, and by controlling the power management integrated circuit 120, may control a charge operation so that the first battery 110 is charged, based on the power received from the second mobile device 200. According to an implementation example embodiment, the control circuit 140 may include a micro control unit (MCU). However, example embodiments are not limited thereto, and the control circuit 140 may include a processor or a central processing unit (CPU).

When the first battery 110 is charged in the over-discharged state, noise may occur in a current, which is output to the first connection terminal T1, due to various causes. When noise occurs, a current output to the first connection terminal T1 may be toggled. A toggled current will be described below in more detail with reference to FIGS. 4 and 6.

Like the first mobile device 100, the second mobile device 200 may include a second battery 210, a power management integrated circuit 220, a PLC module 230, and/or a control circuit 240. In example embodiments, the second mobile device 200 may further include an input voltage terminal Tin for receiving an external input voltage Vin from the outside. For example, the input voltage terminal Tin may receive the input voltage Vin which is input from an alternating current (AC) power source corresponding to a home power source or another power source (for example, a computer or an auxiliary battery). In example embodiments, the second mobile device 200 may wirelessly receive the external input voltage Vin from the outside.

The power management integrated circuit 220 may charge the second battery 210 on the basis of the external input voltage Vin received from the outside. The power management integrated circuit 220 may include a converter (not shown) which generates a conversion voltage Vc from the external input voltage Vin received from the outside or a battery voltage of the second battery 210. The converter may include a DC-DC converter, and for example, the converter may include a step-up converter (for example, a boost converter), which converts a low input voltage Vin or battery voltage into a high conversion voltage Vc, or a step-down converter (for example, a buck converter) which converts a high input voltage Vin or battery voltage into a low conversion voltage Vc.

The PLC module 230 may receive power from the first mobile device 100 or may transmit or receive data to or from the first mobile device 100, based on control by the control circuit 240. For example, the PLC module 230 may modulate a voltage signal or a current signal, which is to be output through the second connection terminal T2, and may demodulate the voltage signal and the current signal each received through the second connection terminal T2. For example, the second mobile device 200 may include a current source, a current modulator, and a voltage demodulator, and thus, may receive data through demodulation of the voltage signal and may transmit data through modulation of the current signal.

The control circuit 240 may control an overall operation of the second mobile device 200. For example, the control circuit 240 may control a communication operation performed on the first mobile device 100 by controlling the PLC module 230 and may control the power management integrated circuit 220 so that power is supplied to the first mobile device 100. According to an implementation example embodiment, the control circuit 240 may include an MCU. However, example embodiments are not limited thereto, and the control circuit 240 may include a processor or a CPU.

The control circuit 240 may determine a charged state of the first battery 110 on the basis of a toggle time which is a time period where a current received from the first mobile device 100 through the second input terminal T2 is toggled. Also, the control circuit 240 may determine a charged state of the first battery 110 on the basis of a low current duration time which is a time at which a current lower than a first reference current is received through the second input terminal T2. A structure and an operating method of the control circuit 240 for determining a charged state of the first battery 110 will be described below in more detail with reference to FIGS. 8 and 9. Based on the toggle time and the low current duration time, the second mobile device 200 according to example embodiments may accurately determine a charged state of the first battery 110 included in the first mobile device 100 and may selectively supply power to the first mobile device 100 on the basis of the charged state of the first battery 110. Therefore, the second mobile device 200 may be reduced or prevented from supplying undesired power to the first mobile device 100.

In example embodiments, the first mobile device 100 may include a wireless earbud or a wireless earphone, and the second mobile device 200 may include a wireless earbud charger or a wireless earphone charger. Each of the first battery 110 and the second battery 210 may include a primary cell incapable of recharging or a fuel cell or a secondary cell capable of recharging.

Figure 2:
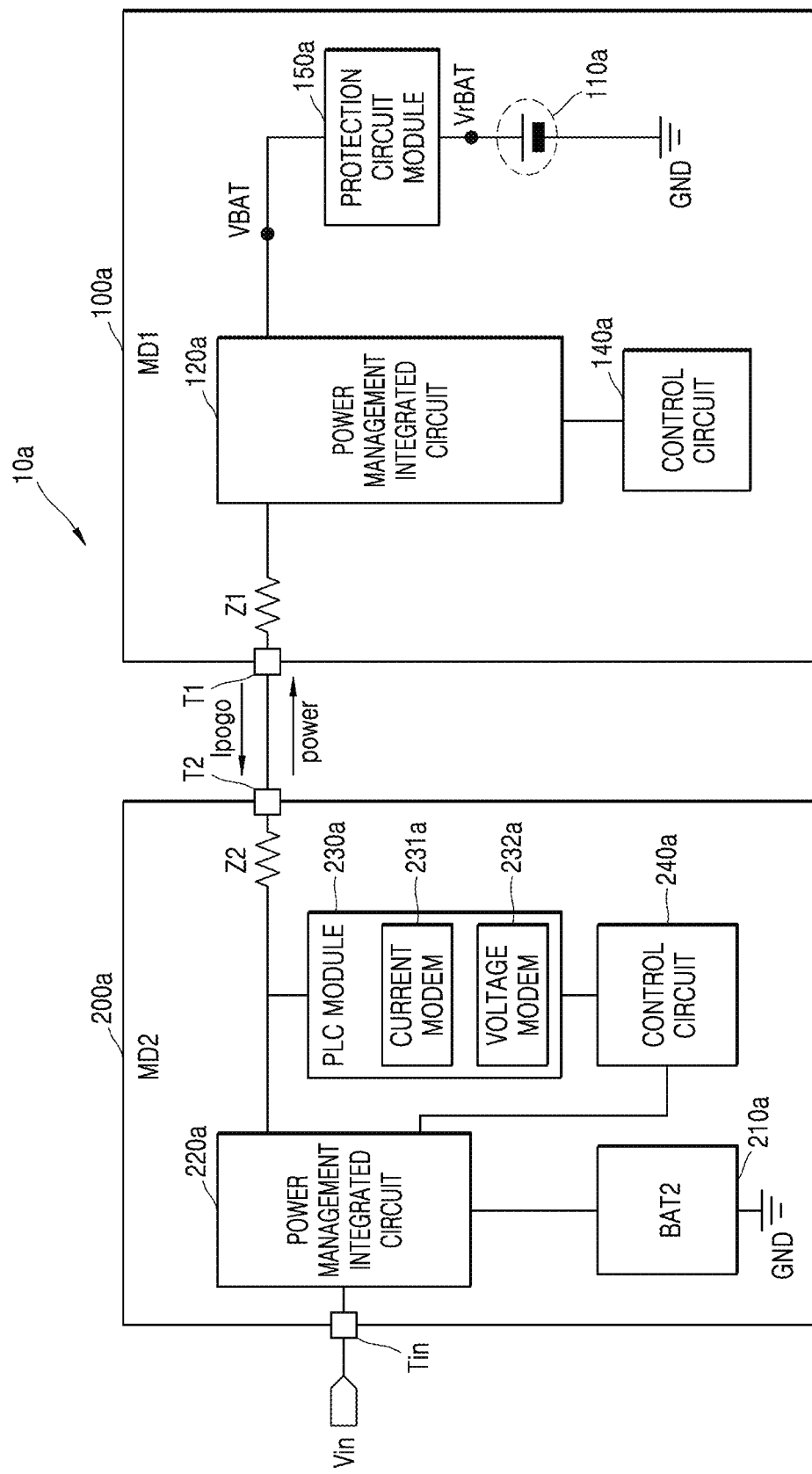
FIG. 2 illustrates an example of a mobile system according to example embodiments.

FIG. 2 illustrates a detailed example of a mobile system 10a according to example embodiments. Referring to FIG. 2, the mobile system 10a may include a first mobile device 100a and a second mobile device 200a. Descriptions, which are the same as or similar to descriptions given above with reference to FIG. 1, may be omitted. In example embodiments, the first mobile device 100a may not include a PLC module. Therefore, the first mobile device 100a may include a device which is unable to perform PLC-based communication and is supplied with only power from the second mobile device 200a.

The first mobile device 100a may further include a protection circuit module 150a. The protection circuit module 150a may perform a function of protecting a first battery 110a. For example, the protection circuit module 150a may perform an over-discharge protection function, an over-charge protection function, and an over-current protection function. A voltage between a power management integrated circuit 120a and the protection circuit module 150a may be a battery voltage VBAT, and the first battery 110a may be charged with a real battery voltage VrBAT. Based on a function performed by the protection circuit module 150a, the battery voltage VBAT may be the same as or different from the real battery voltage VrBAT. For example, in a case where the protection circuit module 150a performs the over-discharge protection function, the battery voltage VBAT may be higher than the real battery voltage VrBAT. That is, the power management integrated circuit 120a may recognize that the first battery 110a is charged with the battery voltage VBAT. Therefore, the power management integrated circuit 120a may misrecognize a charged voltage of the first battery 110a, extract excessive power from the first battery 110a, and transfer power to the control circuit 140a and other elements. Accordingly, the real battery voltage VrBAT of the first battery 110a may be quickly consumed. The power management integrated circuit 120a may not transfer power to the control circuit 140a and the other elements due to the real battery voltage VrBAT, and the real battery voltage VrBAT may be gradually charged based on power received from the second mobile device 200a. As a result, due to the power received from the second mobile device 200a, the real battery voltage VrBAT may be charged in the over-discharged state, the normal state, and the fully-charged state, or in the over-discharged state, unstable charging may be performed. Due to the unstable charging, noise may occur in a pogo current Ipogo output to a first input terminal T1 of the first mobile device 100a. In other words, the pogo current Ipogo may be toggled in the over-discharged state. However, a cause of toggle occurring when the first battery 110a is in the over-discharged state is not limited thereto, and the pogo current Ipogo may be toggled due to a parasitic capacitance or a parasitic inductance. The second mobile device 200a according to example embodiments may determine a charged state of the first battery 110a on the basis of a toggle time which is a time period where the pogo current Ipogo is toggled. In example embodiments, the first connection terminal T1 and the second connection terminal T2 may be referred as pogo pin. In example embodiments, the pogo current Ipogo may mean a current transferred from the first connection terminal T1 to the second connection terminal T2 or a current transferred from the second connection terminal T2 to the first connection terminal T1.

A PLC module 230a of the second mobile device 200a may include a current modem 231a and/or a voltage modem 232a. The control circuit 240a may generate control signals for controlling the current modem 231a and the voltage modem 232a. The current modem 231a may demodulate a current received through the second connection terminal T2 and may provide a demodulated signal to the control circuit 240a. The voltage modem 232a may receive a control signal from the control circuit 240a and may modulate a voltage signal on the basis of the received control signal. The voltage modem 231a may transmit the generated voltage signal to the first mobile device 100a through a second impedance circuit Z2 and a second connection terminal T2 of the second mobile device 200a. The voltage modem 232a may include a linear regulator, and for example, may include a low drop-output (LDO) regulator.

The first mobile device 100a may include a first impedance circuit Z1, and the second mobile device 200a may include a second impedance circuit Z2. The first impedance circuit Z1 may be connected to the first connection terminal T1, and the second impedance circuit Z2 may be connected to the second connection terminal T2. Each of the first impedance circuit Z1 and the second impedance circuit Z2 may include at least one of a resistor, a capacitor, and an inductor. By transferring, through a power line, a signal including voltage swing or a signal including current swing, data may be transmitted and received and a swing level of a signal transmitted through the power line may be adjusted based on impedance values of the first and second impedance circuits Z1 and Z2.

Figure 3:
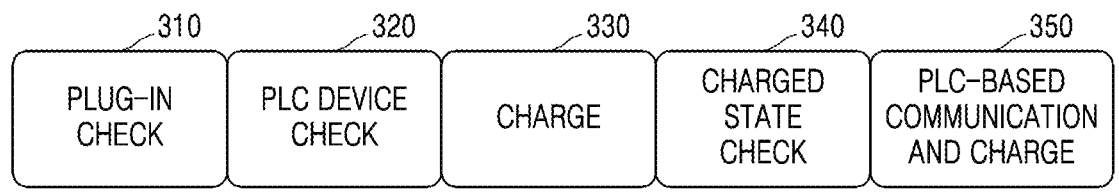
FIG. 3 is a diagram of an operation of a second mobile device according to example embodiments.

FIG. 3 is a diagram describing an operation of a second mobile device according to example embodiments. Referring to FIG. 3, in a plug-in check operation 310, the second mobile device MD2 may check whether the second input terminal T2 thereof is connected to the first input terminal T1 of the first mobile device MD1. For example, the second mobile device MD2 may measure an impedance variation of the second input terminal T2 thereof to check whether the second input terminal T2 thereof is connected to the first input terminal T1 of the first mobile device MD1.

In a PLC device check operation 320, the second mobile device MD2 may check whether the first mobile device MD1 is a device including a PLC module. For example, the second mobile device MD2 may transmit PLC check data to the first mobile device MD1 through a power line. The PLC check data may be determined based on a predefined or alternatively, desired data structure. When the second mobile device MD2 receives predefined or alternatively, desired response data from the first mobile device MD1 for a response time, the second mobile device MD2 may recognize the first mobile device MD1 as a device capable of PLC-based communication, and when the second mobile device MD2 does not receive the predefined or alternatively, desired response data from the first mobile device MD1 for the response time, the second mobile device MD2 may recognize the first mobile device MD1 as a device incapable of PLC-based communication.

In a charge operation 330, the second mobile device MD2 may supply power to the first mobile device MD1. For example, the power management integrated circuit 220 of the second mobile device MD2 may generate the conversion voltage Vc from the external input voltage Vin received through the input voltage terminal Tin from the outside or the battery voltage of the second battery 210 and may output the conversion voltage Vc to the second input terminal T2, thereby supplying power to the first mobile device MD1. However, the present example embodiment is not limited thereto, and the second mobile device MD2 may generate a conversion current Ic from the input voltage Vin or the battery voltage of the second battery 210 and may output the conversion current Ic to the second input terminal T2, thereby supplying power to the first mobile device MD1.

In a charged state check operation 340, the second mobile device MD2 may check a charged state of the first battery 110 included in the first mobile device MD1 for a reference time. In FIG. 3, it is illustrated that the charged state check operation 340 is performed after the charge operation 330, but the present example embodiment is not limited thereto and the charged state check operation 340 may be included in the charge operation 330. When the charged state of the first battery 110 is determined to be the over-discharged state or the normal state, the second mobile device MD2 may continuously supply power to the first mobile device MD1, in the charge operation 330. When the charged state of the first battery 110 is determined to be the fully-charged state, the second mobile device MD2 may cut off the supply of power to the first mobile device MD1, in the charge operation 330. That is, the second mobile device MD2 may selectively supply power to the first mobile device MD1 on the basis of the charged state of the first battery 110. A structure and an operating method of the second mobile device MD2 for determining the charged state of the first battery 110 will be described below in more detail with reference to FIGS. 8 and 9.

In a PLC-based communication and charge operation 350, the second mobile device MD2 may perform PLC-based communication with the first mobile device MD1, and simultaneously, may provide power to the first mobile device MD1.

Figure 4:
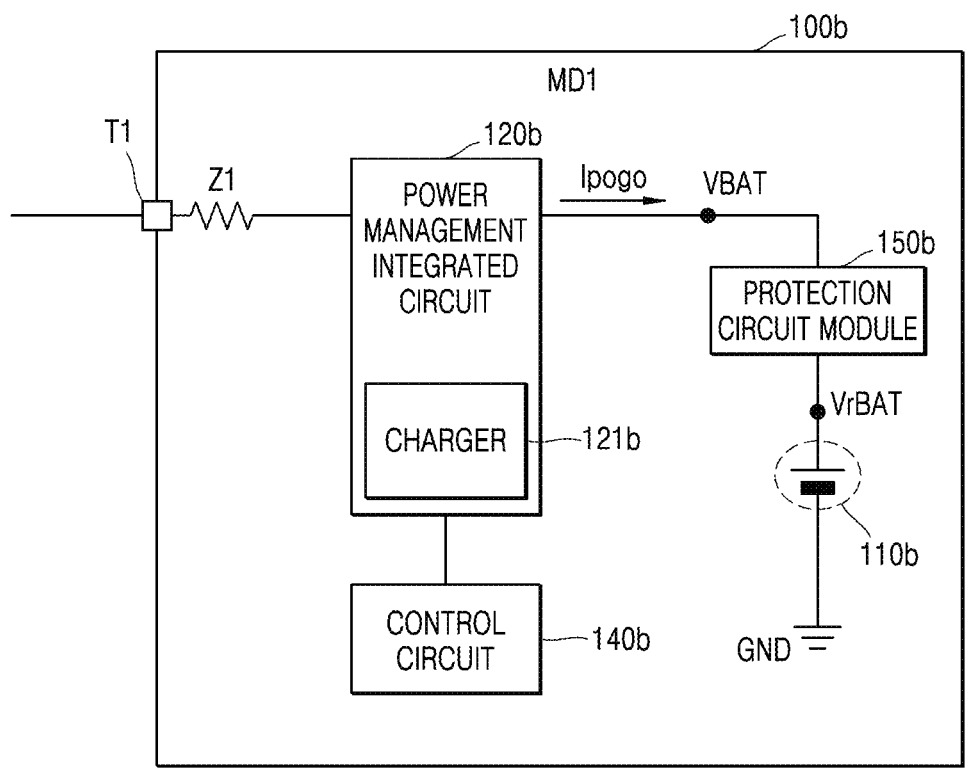
FIG. 4 is a diagram of a first mobile device according to example embodiments.
Figure 5:
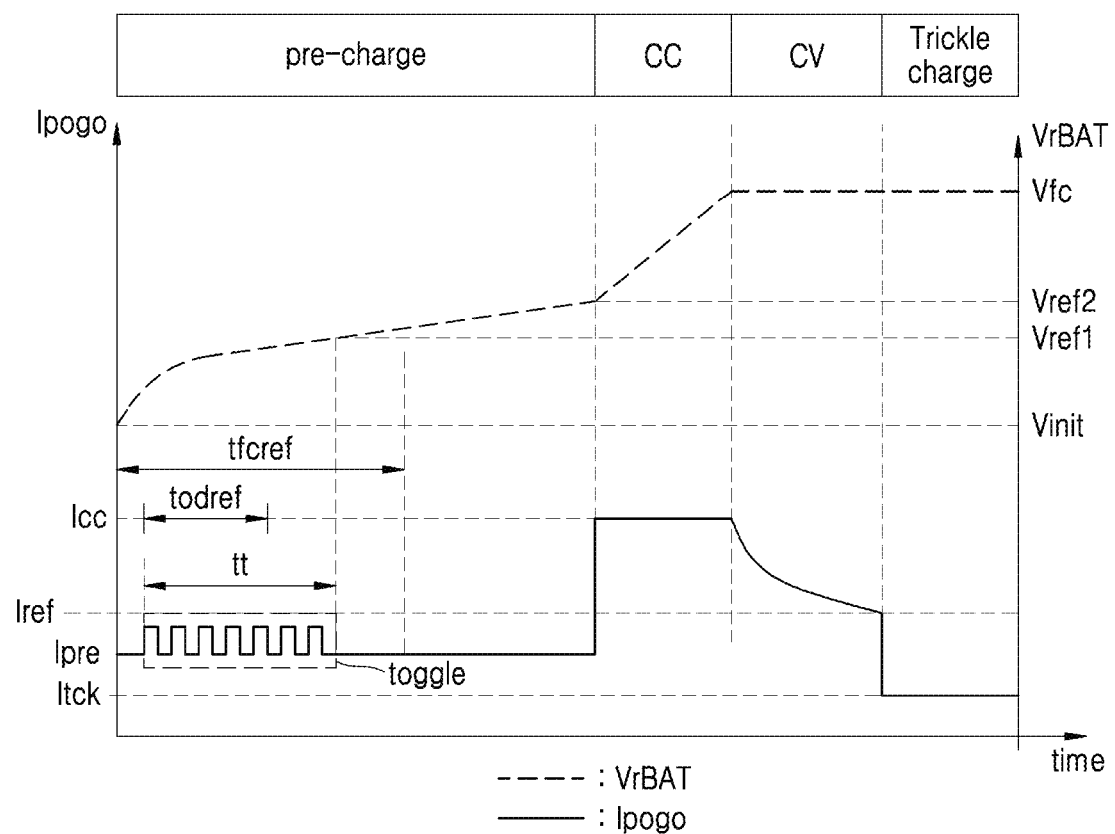
FIG. 5 is a graph showing a charged current and a charged voltage of a first battery with respect to a charge step.

FIG. 4 is a diagram describing in more detail a first mobile device 100b according to example embodiments. FIG. 5 is a graph showing a charged current and a charged voltage of a first battery with respect to a charge operation. Referring to FIG. 4, a power management integrated circuit 120b of the first mobile device 100b may include a charger 121b. The charger 121b may monitor a real battery voltage VrBAT of a first battery 110b and may charge the first battery 110b by using different schemes on the basis of the real battery voltage VrBAT. For example, the charger 121b may charge the first battery 110b by using the pre-charge scheme, the constant-current scheme, the constant-voltage scheme, or the trickle charge scheme. As illustrated in FIG. 5, a period where the first battery 110b is charged based on the pre-charge scheme may be referred to as a pre-charge period, a period where the first battery 110b is charged based on the constant-current scheme may be referred to as a constant-current (CC) period, a period where the first battery 110b is charged based on the constant-voltage scheme may be referred to as a constant-voltage (CV) period, and a period where the first battery 110b is charged based on the trickle charge scheme may be referred to as a trickle charge period.

The first battery 110b may receive a pogo current Ipogo from the charger 121b, and thus, may be charged. That is, the charger 121b may provide the first battery 110b with the pogo current Ipogo having different levels on the basis of a real battery voltage VrBAT. The pogo current Ipogo may be provided to the first battery 110b, and thus, the real battery voltage VrBAT may increase. A path where a first input terminal T1 and a first impedance Z1 are disposed may be connected to a charge path connected to the first battery 110b. Therefore, the pogo current Ipogo illustrated in FIG. 4 may have the same level as that of the pogo current Ipogo illustrated in FIG. 2. However, for convenience of description, a direction in which the pogo current Ipogo flows will be differently described herein. For example, in describing charging of the first battery 110b, it may be illustrated that the pogo current Ipogo flows in a direction toward the first battery 110b, and in describing an example where a second mobile device MD2 receives the pogo current Ipogo, it may be described that the pogo current Ipogo flows in a direction from the inside of a first mobile device MD1 to the first input terminal T1.

In a pre-charge period, the first battery 110b may be in an over-discharged state where the real battery voltage VrBAT is lower than a predetermined or alternatively, desired second reference voltage Vref2. The real battery voltage VrBAT may be an initiation voltage Vinit. That is, the initiation voltage Vinit may be lower than the second reference voltage Vref2. The second reference voltage Vref2 may be about 2.8 V, but is not limited thereto. The second reference voltage Vref2 may be a pre-charge voltage Vpre described above with reference to FIG. 1. When the pogo current Ipogo is supplied to the first battery 110*b* having an over-discharged state, battery stability may be reduced. Therefore, the charger 121*b* may supply the first battery 110*b* with a current which is equal to or lower than a pre-charge current Ipre. In a pre-charge scheme, as a current equal to or lower than the pre-charge current Ipre is supplied, the real battery voltage VrBAT may increase progressively. When the real battery voltage VrBAT is equal to or higher than the second reference voltage Vref2, the first battery 110*b* may be charged based on the constant-current (CC) scheme. The second reference voltage Vref2 may be a reference voltage which allows an over-discharged state of the first battery 110*b* to be released. In the pre-charge period, the first battery 110*b* may be in the over-discharged state.

In the constant-current (CC) period, the charger 121*b* may supply the first battery 110*b* with a charge current Icc having a level which is higher than that of the pre-charge current Ipre. As the charge current Icc is supplied to the first battery 110*b*, the real battery voltage VrBAT may more quickly increase than in the pre-charge period. When the real battery voltage VrBAT reaches a full charge voltage Vfc, the first battery 110*b* may be charged based on the constant-voltage (CV) scheme. The full charge voltage Vfc may be about 4.35 V to about 4.4 V, but is not limited thereto.

In the constant-voltage (CV) period, the real battery voltage VrBAT may be maintained as the full charge voltage Vfc, and a level of the pogo current Ipogo supplied to the first battery 110*b* may decrease. When the decreased pogo current Ipogo is lower than the reference current Tref, the pogo current Ipogo may be a trickle current Itrk. The reference current Tref may have a value obtained by multiplying a discharge rate of the first battery 110*b* by a threshold rate. For example, the reference current Tref may be about 0.1 C. The reference current Tref may be higher than the pre-charge current Ipre. In the constant-current (CC) period and the constant-voltage (CV) period, the first battery 110*b* may be in the normal state.

In the trickle charge period, the charger 121*b* may supply the first battery 110*b* with the trickle current Itrk, for complementing self-discharging of the first battery 110*b*. The trickle current Itrk may be lower than the reference current Tref. In the trickle charge period, the real battery voltage VrBAT may be the full charge voltage Vfc, and the first battery 110*b* may be in the fully-charged state. According to a charging process of the first battery 110*b*, the pogo current Ipogo may be lower than the reference current Tref in the pre-charge period and the trickle charge period.

Referring to FIG. 5, the pogo current Ipogo may be toggled for a toggle time tt in the pre-charge period. The toggle time tt may end before the real battery voltage VrBAT reaches a first reference voltage Vref1. The pogo current Ipogo may be toggled by various causes. For example, the pogo current Ipogo may be toggled for the toggle time tt on the basis of a difference between the real battery voltage VrBAT and a battery voltage VBAT. Alternatively, the pogo current Ipogo may be toggled by a parasitic capacitance and a parasitic inductance of the first mobile device 100*b*. A process of toggling the pogo current Ipogo, according to example embodiments, will be described below with reference to FIGS. 6 and 7.

When the pogo current Ipogo higher than the reference current Tref is received, the second mobile device MD2 according to example embodiments may determine that the first battery 110*b* is in the normal state. When a low current reception time trec, for which the pogo current Ipogo equal to or lower than the reference current Tref is received, is longer than a full charge reference time tfcref, the second mobile device MD2 according to example embodiments may determine that the first battery 110*b* is in the fully-charged state. The full charge reference time tfcref may be longer than a time which is taken until a real battery voltage VrBAT1 reaches the first reference voltage Vref1 from a time at which the pogo current Ipogo is provided to the first battery 110*b*. When the toggle time tt is longer than an over-discharge reference time todref, the second mobile device MD2 according to example embodiments may determine that the first battery 110*b* is in the over-discharged state. The over-discharge reference time todref may be a reference time for ignoring toggle which occurs due to an unpredicted cause such as an impact applied to the first mobile device MD1 and the second mobile device MD2. For example, the over-discharge reference time todref may be longer than a time for which the pogo current Ipogo is toggled by an external impact. A structure and an operating method of the second mobile device MD2 for determining a charged state of the first battery 110*b* will be described below in more detail with reference to FIGS. 8 and 9.

Figure 6:
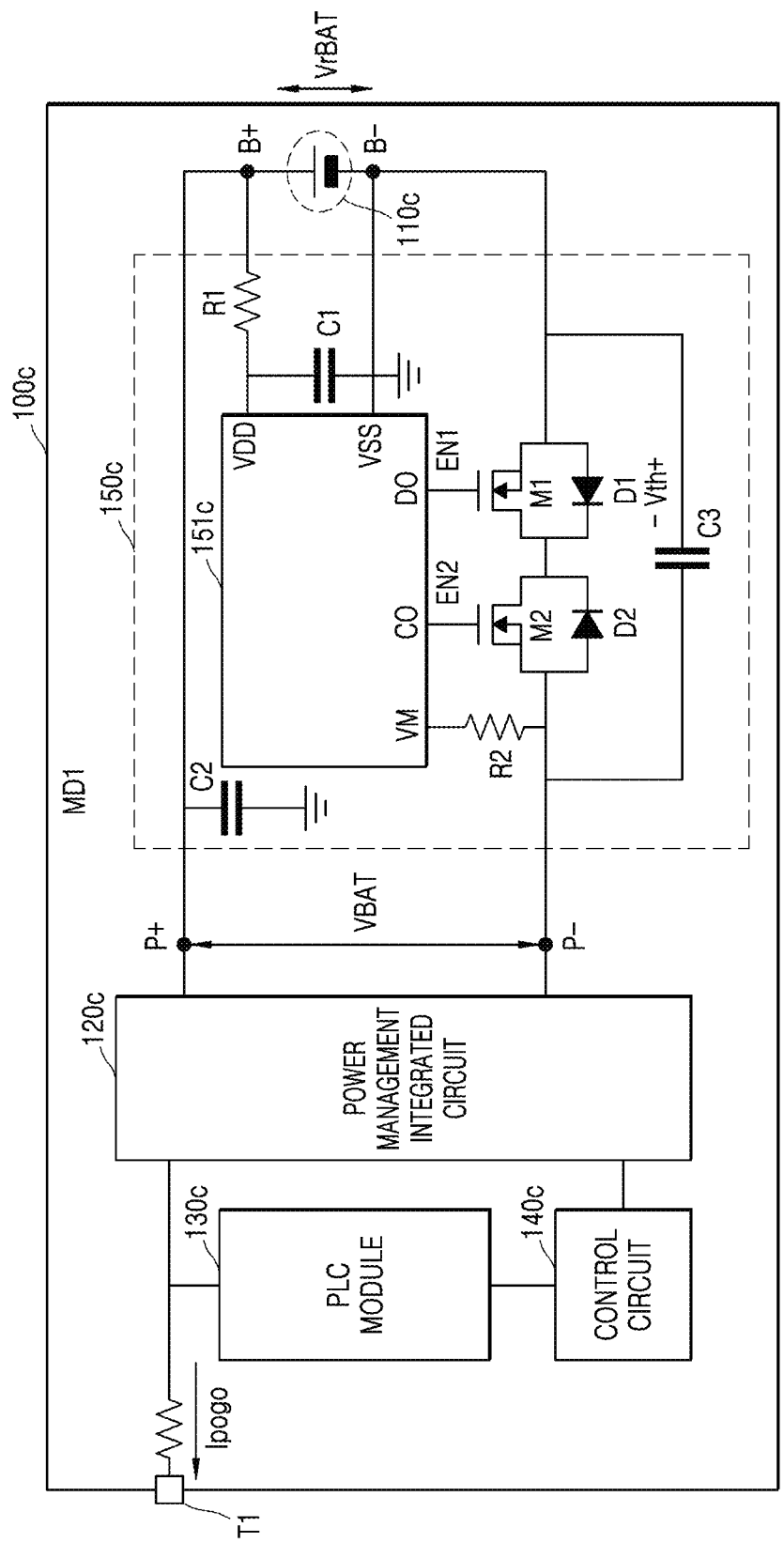
FIG. 6 is a diagram of a protection circuit module according to example embodiments.

FIG. 6 is a diagram describing in more detail a protection circuit module 150*c* according to example embodiments. FIG. 7 is a diagram for describing in more detail an operation of the protection circuit module 150*c* performing an over-discharge protection function. Referring to FIG. 6, the protection circuit module 150*c* may include a discharge switch M1, a charge switch M2, a first diode D1, a second diode D2, a first resistor R1, a second resistor R2, a first capacitor C1, a second capacitor C2, a third capacitor C3, and/or a protection circuit controller 151*c*. The protection circuit controller 151*c* may include a first pin VDD connected to an anode of a first battery 110*c*, a second pin VSS connected to a cathode of the first battery 110*c*, a third pin DO connected to a gate of a discharge switch M1, a fourth pin CO connected to a gate of a charge switch M2, and a fifth pin VM for monitoring a current flowing in a charge path and a discharge path.

The first resistor R1 and the first capacitor C1 may each be a low-pass filter and may remove a high frequency component of components of a voltage applied to the protection circuit controller 151*c*. The second resistor R2 may sense the current flowing in the charge path and the discharge and may transfer the sensed current to the protection circuit controller 151*c*. The second capacitor C2 may protect the protection circuit module 150*c* from electrostatic discharge (ESD). The third capacitor C3 may protect the discharge switch M1 and the charge switch M2 from ESD.

The protection circuit controller 151*c* may measure a real battery voltage VrBAT applied to both ends of the first battery 110*c*, output a first signal EN1 for controlling the discharge switch M1, and output a second signal EN2 for controlling the charge switch M2, thereby protecting the first battery 110*c*. For example, when the real battery voltage VrBAT is lower than a first reference voltage Vref1, the protection circuit controller 151*c* may perform an over-discharge protection function. That is, the protection circuit controller 151*c* may output the first signal EN1 at a logic low level and may output the second signal EN2 at a logic high level, thereby generating a charge path through which the first diode D1 flows. In other words, when the over-discharge protecting function is being performed, the discharge switch M1 may be turned off, and the charge switch M2 may be turned on. The first reference voltage Vref1 may be about 2.6 V, but is not limited thereto. When the real battery voltage VrBAT increases to be equal to or higher than a second reference voltage Vref2, the protection circuit controller 151c may release the over-discharge protection function. That is, the protection circuit controller 151c may output the first signal EN1 at a logic high level and may output the second signal EN2 at a logic high level, thereby generating a path which enables charging and discharging. In other words, all of the discharge switch M1 and the charge switch M2 may be turned on. The second reference voltage Vref2 may be about 2.8 V, but is not limited thereto.

When a charge current flows to the first diode D1, a battery voltage VBAT may increase by an operating voltage Vth of the first diode D1. A power management integrated circuit 120c may provide power to elements of a first mobile device 100c on the basis of the battery voltage VBAT. However, the battery voltage VBAT may be in a state which is higher than the real battery voltage VrBAT, and due to this, a case may occur where the power management integrated circuit 120c provides excessive power to the elements of the first mobile device 100c. Therefore, in a pre-charge period, the first battery 110c may be unstably charged, and due to the unstable charging, noise may occur in a pogo current Ipogo. That is, the pogo current Ipogo may be toggled.

Figure 8:
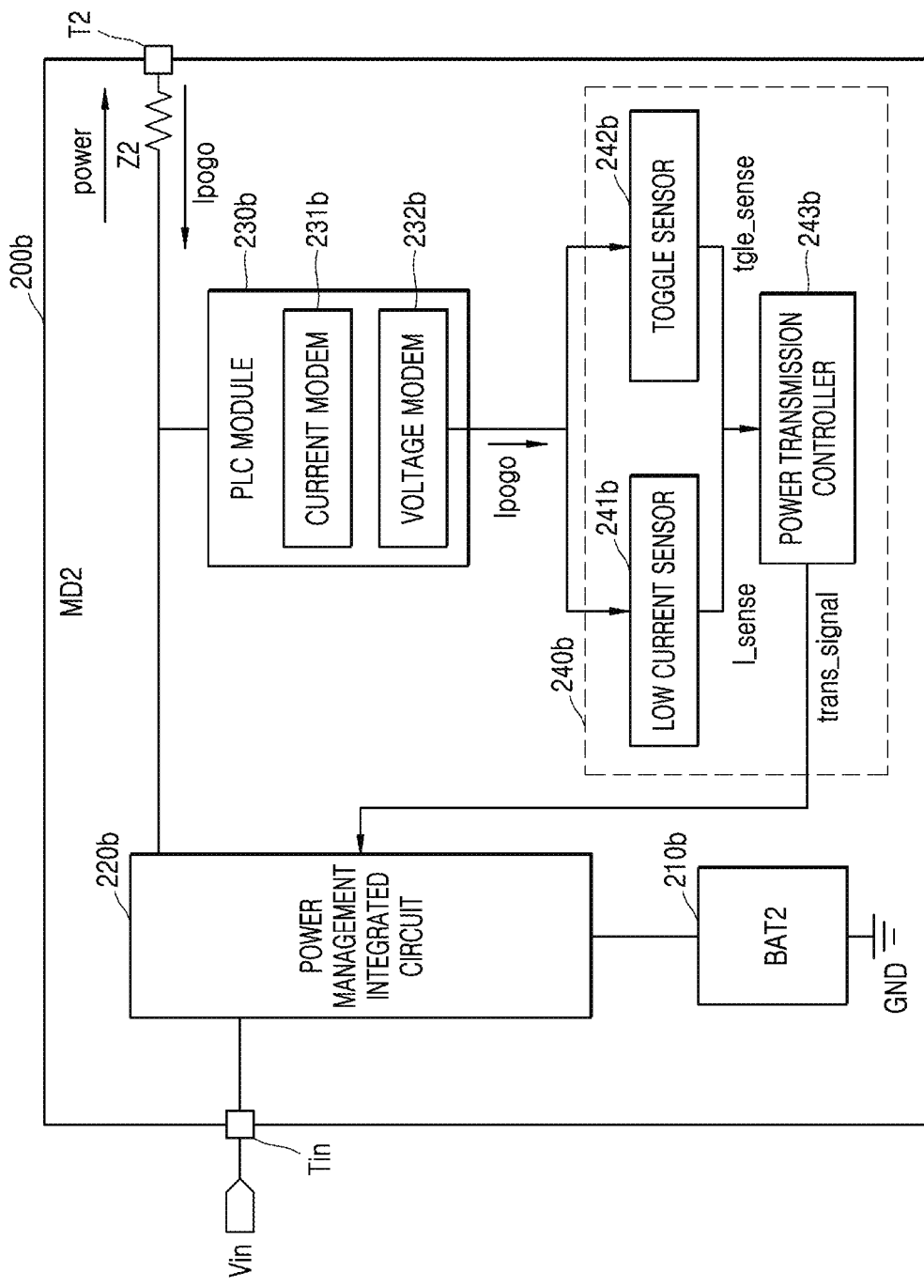
FIG. 8 is a diagram of a second mobile device according to example embodiments.

FIG. 8 is a diagram describing a second mobile device 200b according to example embodiments. Referring to FIG. 8, the second mobile device 200b may include a second battery 210b, a power management integrated circuit 220b, a PLC module 230b, and/or a control circuit 240b. Descriptions, which are the same as or similar to descriptions given above with reference to FIG. 1, may be omitted.

The PLC module 230b may include a voltage modem 231b and/or a current modem 232b. In the PLC device check operation 320 described above with respect to FIG. 3, the PLC module 230b may perform PLC-based communication with a first mobile device MD1 on the basis of a voltage signal or a current signal. For example, in a case where the second mobile device 200b transmits the voltage signal as a data signal, the voltage modem 231b may generate the data signal having a logic high level or a logic low level through a voltage modulation operation on the basis of a control signal received from the control circuit 240b. In a case where the second mobile device 200b transmits the current signal as a data signal, the current modem 232b may generate the data signal having a logic high level or a logic low level through a current modulation operation on the basis of a control signal received from the control circuit 240b. In the charge check operation 340 described above with respect to FIG. 3, the PLC module 230b may receive a pogo current Ipogo from a second input terminal T2 of the second mobile device 200b and may transfer the received pogo current Ipogo to the control circuit 240b.

As described above with reference to FIG. 3, after the PLC device check operation 320, the second mobile device 200b may perform a charge operation 330 of supplying power to a first mobile device MD1 and a charged state check operation 340 of checking a charged state of a first battery BAT1 included in the first mobile device MD1. The charge operation 330 may include the charged state check operation 340. That is, the second mobile device 200b may check a charged state of the first battery BAT1 while providing power through the second input terminal T2.

The control circuit 240b may include a low current sensor 241b, a toggle sensor 242b, and/or a power transmission controller 243b. The low current sensor 241b may compare the pogo current Ipogo with a reference current Tref and may output a low current sensing signal I_sense to the power transmission controller 243b. For example, when the pogo current Ipogo is higher than the reference current Tref, the low current sensing signal I_sense may be logic low, and when the pogo current Ipogo is equal to or lower than the reference current Tref, the low current sensing signal I_sense may be logic high. However, the present example embodiment is not limited thereto. The toggle sensor 242b may compare the toggle time tt with the over-discharge reference time todref and may output a toggle sense signal tgle_sense to the power transmission controller 243b. For example, when the toggle time tt is longer than the over-discharge reference time todref, the toggle sense signal tgle_sense may be logic high, and when the toggle time tt is equal to or shorter than the over-discharge reference time todref, the toggle sense signal tgle_sense may be logic low. However, the present example embodiment is not limited thereto. The power transmission controller 243b may receive the low current sensing signal I_sense and the toggle sense signal tgle_sense and may output a power transmission signal trans_signal to the power management integrated circuit 220b. The power management integrated circuit 220b may transmit power to the second input terminal T2 on the basis of the power transmission signal trans_signal. For example, when the power transmission signal trans_signal is logic high, the power management integrated circuit 220b may transmit power to the second input terminal T2, and when the power transmission signal trans_signal is logic low, the power management integrated circuit 220b may not transmit power to the second input terminal T2. However, the present example embodiment is not limited thereto. When the low current sensing signal I_sense is logic low, the power transmission controller 243b may determine that a first battery BAT1 of the first mobile device MD1 is in the normal state. Therefore, the power transmission controller 243b may output the power transmission signal trans_signal having a logic high level so that the first battery BAT1 is charged. When the low current sensing signal I_sense is logic high and the toggle sense signal tgle_sense is logic low, the power transmission controller 243b may determine that the first battery BAT1 of the first mobile device MD1 is in the fully-charged state. Therefore, the power transmission controller 243b may output the power transmission signal trans_signal having a logic low level so that the first battery BAT1 is not charged. When the low current sensing signal I_sense is logic high and the toggle sense signal tgle_sense is logic high, the power transmission controller 243b may determine that the first battery BAT1 of the first mobile device MD1 is in the over-discharged state. Therefore, the power transmission controller 243b may output the power transmission signal trans_signal having a logic high level so that the first battery BAT1 is charged.

The second mobile device MD2 according to example embodiments may accurately determine a charged state of the first battery BAT1 included in the first mobile device MD1 and may selectively supply power to the first mobile device MD1. Also, even when the pogo current Ipogo is toggled, the second mobile device MD2 according to example embodiments may not misrecognize an over-discharged state and a fully-charged state of the first battery BAT1, thereby reducing or preventing a problem where power is excessively supplied or insufficiently supplied to the first battery BAT1.

Figure 9:
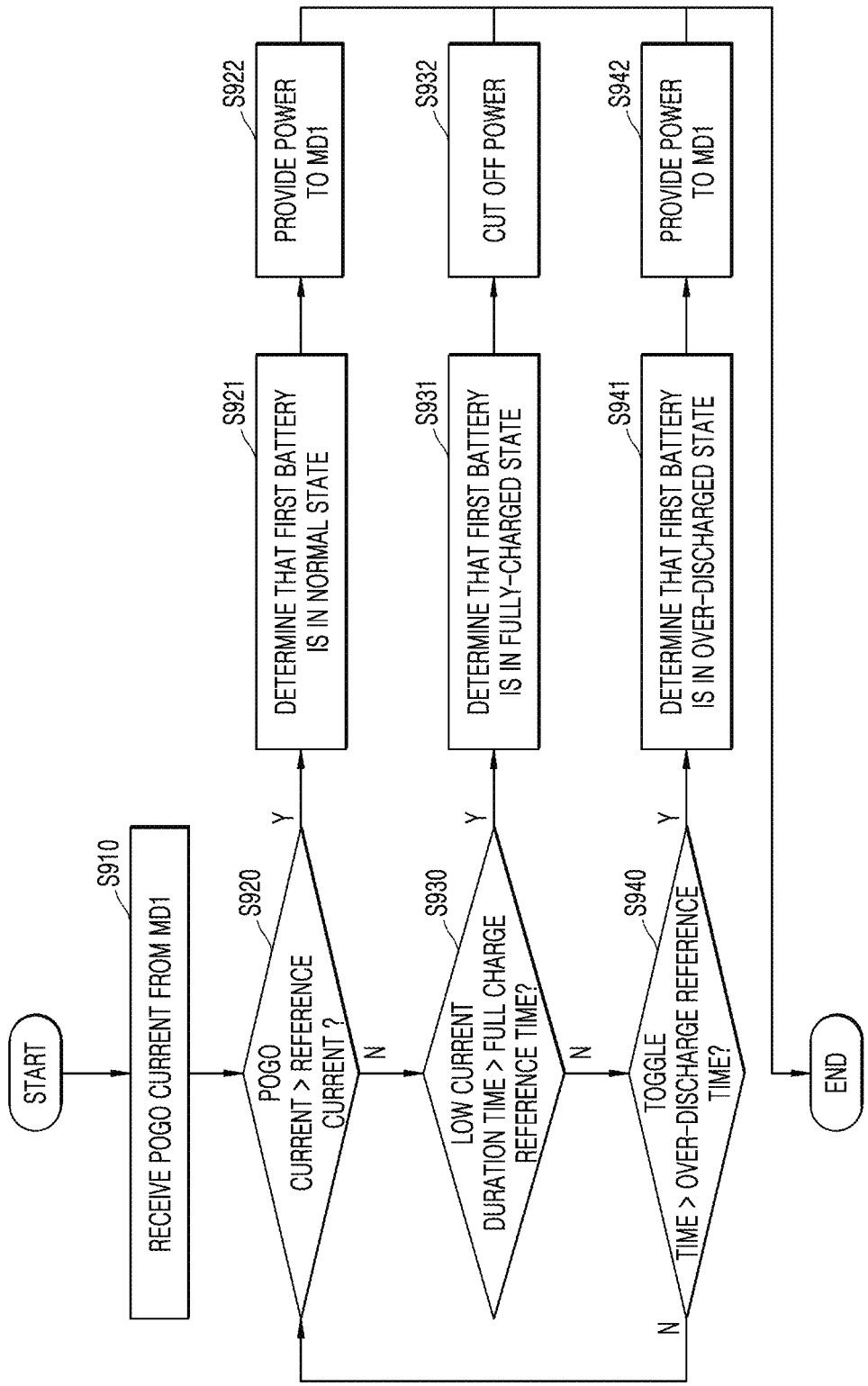
FIG. 9 is a flowchart of an operating method of a second mobile device according to example embodiments.

FIG. 9 is a flowchart describing an operating method of a second mobile device MD2 according to example embodiments. Referring to FIG. 9, in operation S910, the second mobile device MD2 may receive a pogo current Ipogo from a first mobile device MD1.

In operation S920, the second mobile device MD2 may compare with the pogo current Ipogo with a reference current Tref. When the pogo current Ipogo is higher than the reference current Tref, the second mobile device MD2 may perform operation S921, and when the pogo current Ipogo is equal to or lower than the reference current Tref, the second mobile device MD2 may perform operation S930.

In operation S921, the second mobile device MD2 may determine that a first battery BAT1 included in the first mobile device MD1 is in the normal state. In operation S922, the second mobile device MD2 may provide power to the first mobile device MD1 so that the first battery BAT1 is charged.

In operation S930, the second mobile device MD2 may compare a low current reception time trec with a full charge reference time tfcref. The low current reception time trec may be a time for which the pogo current Ipogo equal to or lower than the reference current Tref is received. When the low current reception time trec is longer than the full charge reference time tfcref, the second mobile device MD2 may perform operation S931, and when the low current reception time trec is equal to or shorter than the full charge reference time tfcref, the second mobile device MD2 may perform operation S940.

In operation S931, the second mobile device MD2 may determine that the first battery BAT1 included in the first mobile device MD1 is in the fully-charged state. In operation S932, the second mobile device MD2 may cut off power provided to the first mobile device MD1 so that the first battery BAT1 is not charged.

In operation S940, the second mobile device MD2 may compare a toggle time tt with an over-discharge reference time todref. When the toggle time tt is longer than the over-discharge reference time todref, the second mobile device MD2 may perform operation S941, and when the toggle time tt is equal to or shorter than the over-discharge reference time todref, the second mobile device MD2 may perform operation S920.

In operation S941, the second mobile device MD2 may determine that the first battery BAT1 included in the first mobile device MD1 is in the over-discharged state. In operation S942, the second mobile device MD2 may provide power to the first mobile device MD1 so that the first battery BAT1 is charged.

Figure 10:
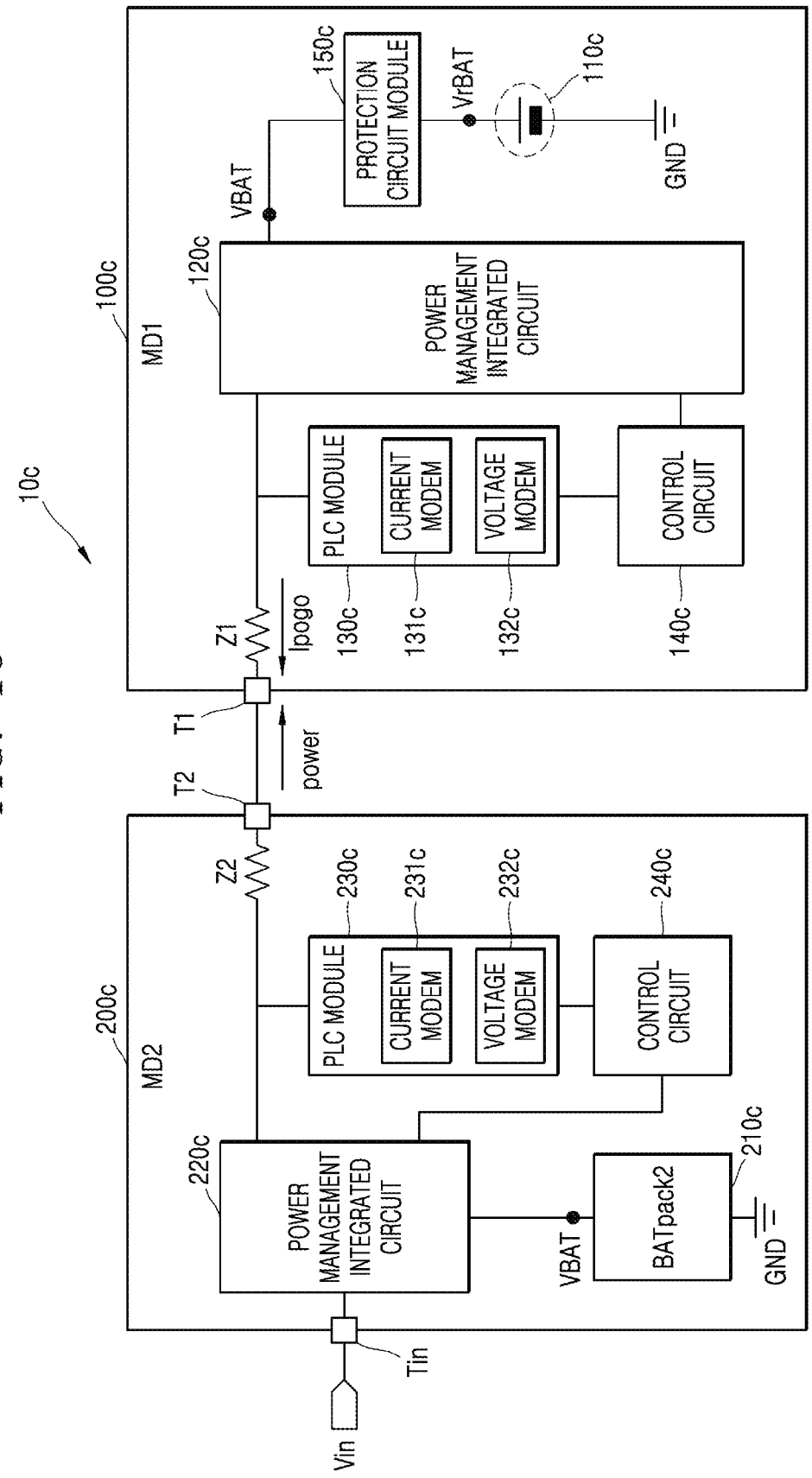
FIG. 10 is a diagram of a mobile system according to example embodiments.

FIG. 10 is a diagram describing a mobile system 10c according to example embodiments. Referring to FIG. 10, the mobile system 10c may include a first mobile device 100c and a second mobile device 200c. Descriptions, which are the same as or similar to descriptions given above with reference to FIG. 1, may be omitted. The first mobile device 100c may include a PLC module 130c. Therefore, as described above with reference to FIG. 3, the second mobile device 100c and the second mobile device 200c may transmit and receive PLC check data and response data therebetween to perform PLC-based communication.

The PLC module 130c may include a current modem 131c and/or a voltage modem 132c. Like the second mobile device 200b described above with reference to FIG. 8, in a case where the first mobile device 100c transmits a voltage signal as a data signal, the voltage modem 132c may generate the data signal having a logic high level or a logic low level through a voltage modulation operation on the basis of a control signal received from the control circuit 140c. In a case where the first mobile device 100c transmits a current signal as a data signal, the current modem 131c may generate the data signal having a logic high level or a logic low level through a current modulation operation on the basis of a control signal received from the control circuit 140c.

However, as described above with reference to FIGS. 5 to 7, when the first battery 110c is in the over-discharged state, a pogo current Ipogo may be toggled. For the same reason as a toggle of the pogo current Ipogo, noise may occur in a data signal used for PLC-based communication.

Figure 11:
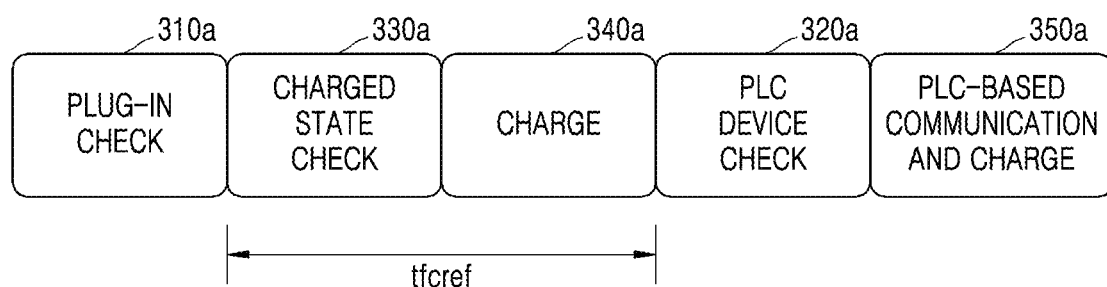
FIG. 11 is a diagram illustrating power line communication (PLC)-based communication according to example embodiments.

FIG. 11 is a diagram describing PLC-based communication according to example embodiments. Referring to FIG. 11, in order to reduce or prevent noise of a data signal from occurring when a first battery BAT1 included in a first mobile device MD1 performs PLC-based communication in the over-discharged state, a second mobile device MD2 may perform a PLC device check operation 320a after a charged state check operation 330a and a charge operation 340a. That is, when it is determined that the first battery BAT1 is in the over-discharged state, the second mobile device MD2 may perform the PLC device check operation 320a after a full charge reference time tfcref elapses from a time at which the charged state check operation 330a starts.

Figure 12:
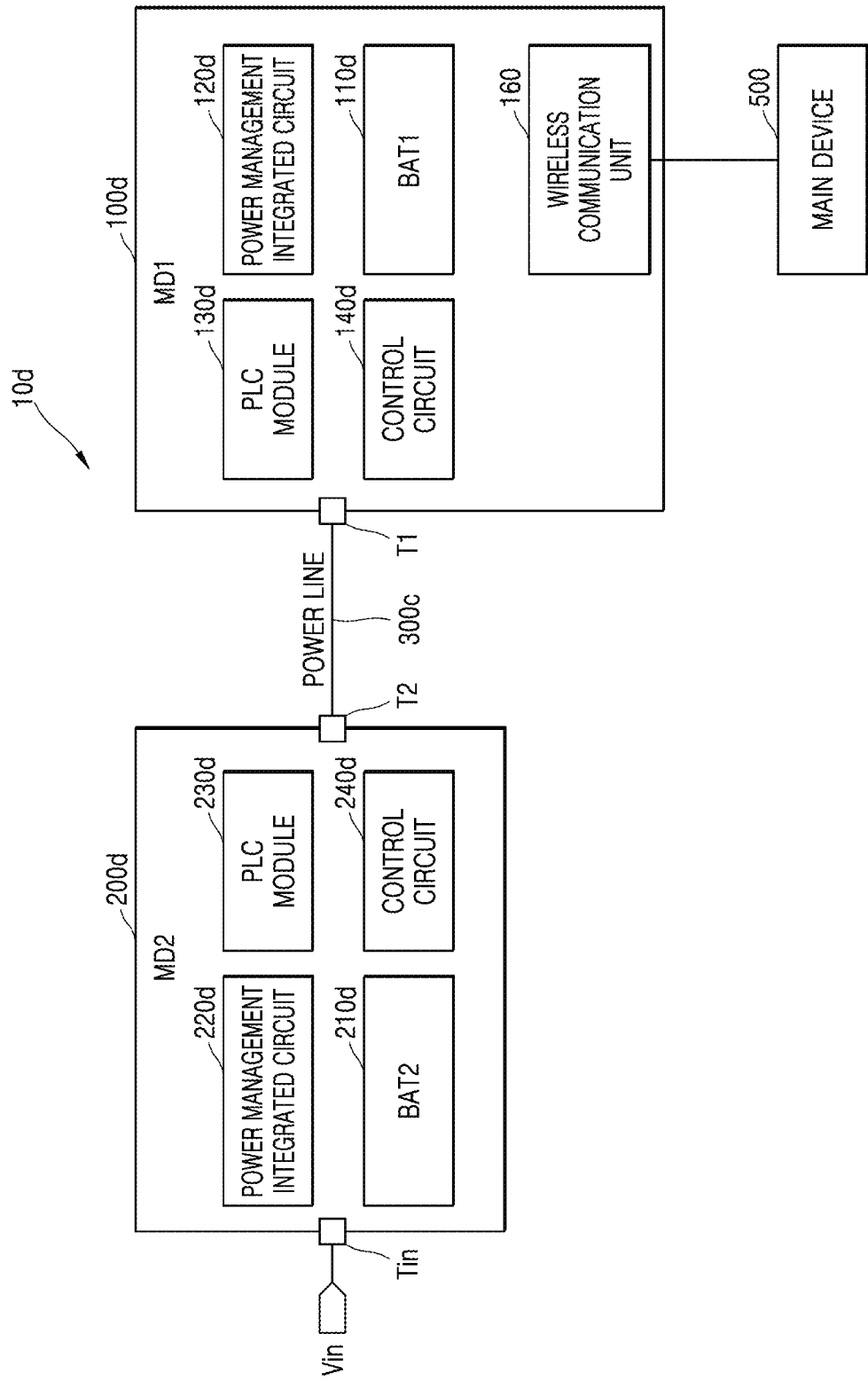
FIG. 12 is a diagram of a mobile system according to example embodiments.

FIG. 12 is a diagram describing a mobile system 10d according to example embodiments. Referring to FIG. 12, the mobile system 10d may include a first mobile device 100d and a second mobile device 200d, and the first and second mobile devices 100d and 200d may correspond to an implementation example of the first and second mobile devices 100 and 200 of FIG. 1. Descriptions given above with reference to FIGS. 1 to 11 may be applied to the present example embodiment.

The first mobile device 100d may include a wireless communication unit 160. The wireless communication unit 160 may perform wireless communication with a main device 500. For example, the wireless communication unit 160 may be implemented as a Bluetooth module and may receive data from the main device 500 through Bluetooth communication. For example, the main device 500 may include a smartphone, a tablet personal computer (PC), a PC, a smart television (TV), a portable phone, a personal digital assistant (PDA), a laptop computer, a media player, a micro-server, a global positioning system (GPS) device, an e-book terminal, a digital broadcasting terminal, a navigation device, a kiosk PC, an MP3 player, a digital camera, and other mobile or non-mobile computing devices, but is not limited thereto. As another example, the main device 500 may include wearable devices such as a wristwatch, glasses, a hairband, and a finger ring each including a communication function and a data processing function.

The wireless communication unit 160 of the first mobile device 100d may receive data from the main device 500 and may transfer the received data to the second mobile device 200d through PLC-based communication. In some example embodiments, a host device may include the first mobile device 100d, and a client device may include the second mobile device 200d. The first mobile device 100d may include an earbud, and the second mobile device 200d may include an earbud charger.

Figure 13:
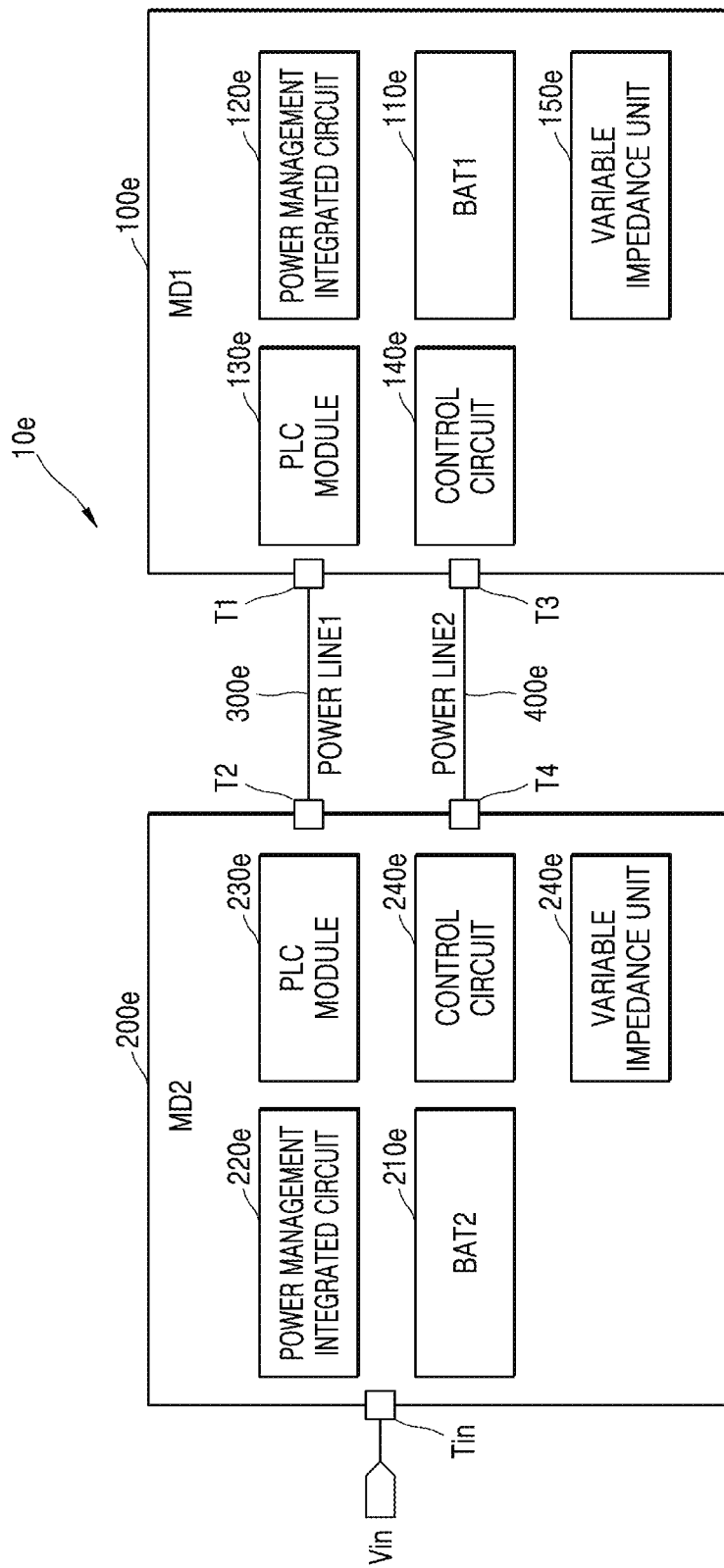
FIG. 13 illustrates a mobile system according to example embodiments.

FIG. 13 illustrates a mobile system 10e according to example embodiments. Referring to FIG. 13, the mobile system 10e may include a first mobile device (MD1) 100e and a second mobile device (MD2) 200e, and the first mobile device 100e and the second mobile device 200e may transmit and receive power and data therebetween through PLC-based communication. Descriptions, which are the same as or similar to descriptions given above with reference to FIG. 1, may be omitted.

The first mobile device (MD1) 100e may further include a variable impedance unit 150e. The variable impedance unit 150e may be electrically connected to a first connection terminal T1 of the first mobile device (MD1) 100e, may include an impedance element such as a resistor or a capacitor, and may have an impedance which varies based on control by a control circuit 140e. For example, the variable impedance unit 150e may include at least one variable resistor. As another example, the variable impedance unit 150e may include at least one resistor and at least one switch.

The control circuit 140e may determine a PLC mode between the first and second mobile devices 100e and 200e as one of a plurality of PLC modes including a lower speed PLC mode and a higher speed PLC mode. For example, the lower speed PLC mode may correspond to a power communication mode of transferring power through PLC-based communication. For example, the higher speed PLC mode may correspond to a data communication mode of transmitting and receiving data through PLC-based communication. According to example embodiments, the plurality of PLC modes may further include at least one of a PLC mode having a communication speed between the lower speed PLC mode and the higher speed PLC mode, a PLC mode having a communication speed which is lower than that of the lower speed PLC mode, and a PLC mode having a communication speed which is higher than that of the higher speed PLC mode. A power communication operation and a data communication operation may be included in at least one of the plug-in check operation 310, the PLC device check operation 320, the charge operation 330, the charged state check operation 340, and the PLC-based communication and charge operation 350 each described above with reference to FIG. 3.

The control circuit 140e may adjust an impedance of the variable impedance unit 150e on the basis of a determined PLC mode. For example, the control circuit 140e may control the variable impedance unit 150e so that the variable impedance unit 150e has a first impedance in the lower speed PLC mode and may control the variable impedance unit 150e so that the variable impedance unit 150e has a higher second impedance than the first impedance in the higher speed PLC mode. Also, the control circuit 140e may control the PLC module 130e on the basis of the determined PLC mode. Furthermore, the control circuit 140e may perform control so that a first battery 110e is charged based on power received from the second mobile device 200e. For example, the control circuit 140e may be implemented as an MCU. However, the inventive concepts are not limited thereto, and the control circuit 140e may be implemented as a processor or a CPU.

The PLC module 130e may receive power from the second mobile device 200e or may transmit data to the second mobile device 200e, based on the determined PLC mode. For example, the PLC module 130e may modulate a signal (for example, a voltage or a current) which is to be output through a first connection terminal T1 and may demodulate a signal received through the first connection terminal T1. For example, the PLC module 130e may include a current source, a current modulator, and a voltage demodulator.

The second mobile device 200e may further include a variable impedance unit 250e. The variable impedance unit 250e may be electrically connected to a second connection terminal T2, may include an impedance element such as a resistor or a capacitor, and may have an impedance which varies based on control by a control circuit 240e. The variable impedance unit 250e may be implemented to be the same or substantially similar to the variable impedance unit 150e, and description given above with reference to the variable impedance unit 150e may be applied to the variable impedance unit 250e.

The control circuit 240e may determine a PLC mode between the first and second mobile devices 100e and 200e as one of a plurality of PLC modes including the lower speed PLC mode and the higher speed PLC mode. In example embodiments, a communication operation between the first and second mobile devices 100e and 200e may include a power communication operation, a host/client definition operation, and a data communication operation.

The power communication operation may be included in at least one of the charge operation 330, the charged state check operation 340, and the PLC-based communication and charge operation 350 of FIG. 3. In the power communication operation, the second mobile device 200e may transfer power to the first mobile device 100e, and at this time, a PLC mode between the first and mobile devices 100e and 200e may be determined as the lower speed PLC mode.

The host/client definition operation may be included in at least one of the plug-in check operation 310 and the PLC device check operation 320 of FIG. 3. In the host/client definition operation, a host transmitting data and a client receiving the data between the first and mobile devices 100e and 200e, and at this time, a PLC mode between the first and mobile devices 100e and 200e may be still determined as the lower speed PLC mode. For example, the host may be determined as the second mobile device 200e, and the client may be determined as the first mobile device 100e.

The data communication operation may be included in at least one of the PLC device check operation 320 and the PLC-based communication and charge operation 350 of FIG. 3. In the data communication operation, data may be transferred from the host to the client, and at this time, a PLC mode between the first and mobile devices 100e and 200e may be determined as the higher speed PLC mode. For example, the second mobile device 200e may transfer data to the first mobile device 100e. In the data communication operation, a main function of a power line 300e may be changed from a power transfer function to a data transfer function. In example embodiments, in the data communication operation, only data may be transferred through the power line 300e. However, the inventive concepts are not limited thereto, and in the data communication operation, power may be transferred through the power line 300e along with the data.

When data transfer ends, the power communication operation may start again, and a PLC mode between the first and mobile devices 100e and 200e may be determined as the lower speed PLC mode. In the data communication operation, the main function of the power line 300e may be changed from the data transfer function to the power transfer function. In example embodiments, in the power communication operation, only power may be transferred through the power line 300e. However, the inventive concepts are not limited thereto, and in the power communication operation, the data may be transferred through the power line 300e along with the power. The control circuit 240e may adjust an impedance of the variable impedance unit 250e on the basis of the determined PLC mode. For example, the control circuit 240e may control the variable impedance unit 250e so that the variable impedance unit 250e has the first impedance in the lower speed PLC mode and may control the variable impedance unit 250e so that the variable impedance unit 250e has the higher second impedance than the first impedance in the higher speed PLC mode. Also, the control circuit 240e may control the PLC module 230e on the basis of the determined PLC mode. Furthermore, the control circuit 240e may perform control so that a second battery 210e is charged based on an external input voltage Vin received from the outside. The control circuit 240e may be implemented to be the same or substantially similar to the control circuit 140e, and description given above with reference to the control circuit 140e may be applied to the control circuit 240e.

The PLC module 230e may supply power to the first mobile device 100e or may transmit or receive data to or from the first mobile device 100e, based on the determined PLC mode. For example, the PLC module 230e may modulate a signal (for example, a voltage or a current) which is to be output through a second connection terminal T2 and may demodulate a signal received through the second connection terminal T2. For example, the PLC module 230e may include a lower speed PLC modem operating in the lower speed PLC mode and a higher speed PLC modem operating in the higher speed PLC mode.

Generally, a mobile device may include a battery and a power management integrated circuit (PMIC) which manages the battery, and the PMIC may vary a voltage level of a power line by controlling a current or a voltage so as to implement PLC. In some example embodiments, due to a limitation of a current or voltage control speed by the PMIC, too much time may be taken for transmitting and receiving a large amount of data between mobile devices of the related art. However, according to example embodiments, the first and second mobile devices 100e and 200e may determine a PLC mode as the high speed PLC mode for data transmission/reception and may increase impedances of the variable impedance units 150e and 250e connected to the power line 300e in the high speed PLC mode. As described above, according to the present example embodiment, the first and second mobile devices 100e and 200e may vary the impedances of the variable impedance units 150e and 250e on the basis of a communication speed through the power line 300e, thereby effectively supporting the lower speed PLC mode and the high speed PLC mode.

Figure 14:
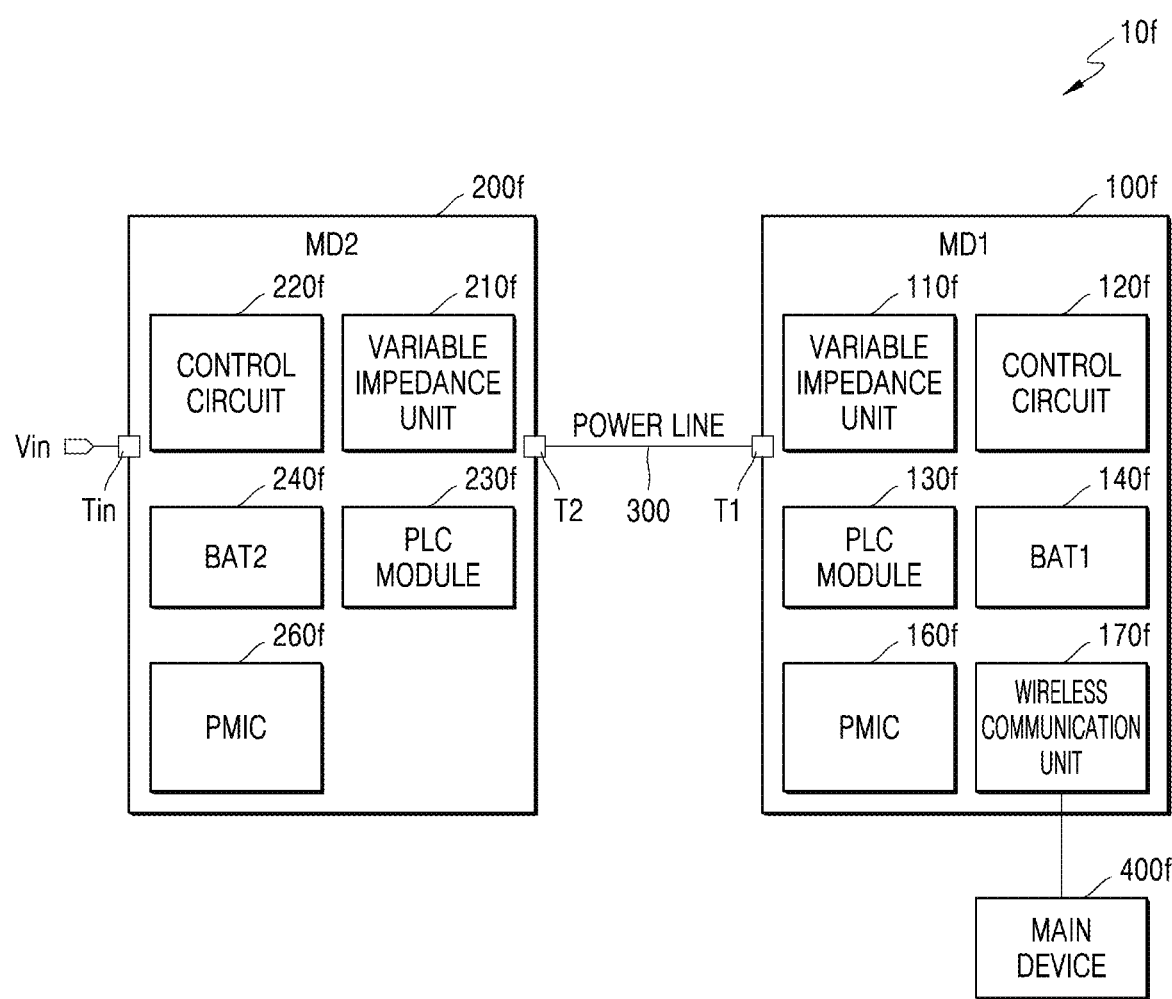
FIG. 14 illustrates a mobile system according to example embodiments.

FIG. 14 illustrates a mobile system 10f according to example embodiments.

Referring to FIG. 14, the mobile system 10f may include a first mobile device 100f and a second mobile device 200f. Descriptions given above with reference to FIGS. 1 to 13 may be applied to the present example embodiment. Descriptions, which are the same as or similar to descriptions given above with reference to FIG. 12, may be omitted. A wireless communication unit 170f of the first mobile device 100f may receive data from a main device 400f and may transfer the received data to the second mobile device 200f through PLC-based communication. In some example embodiments, a host device may include the first mobile device 100f, and a client device may include the second mobile device 200f. In the data communication operation described above with reference to FIG. 13, the first mobile device 100f may transfer data, received from the main device 400f, to the second mobile device 200f.

Figure 15:
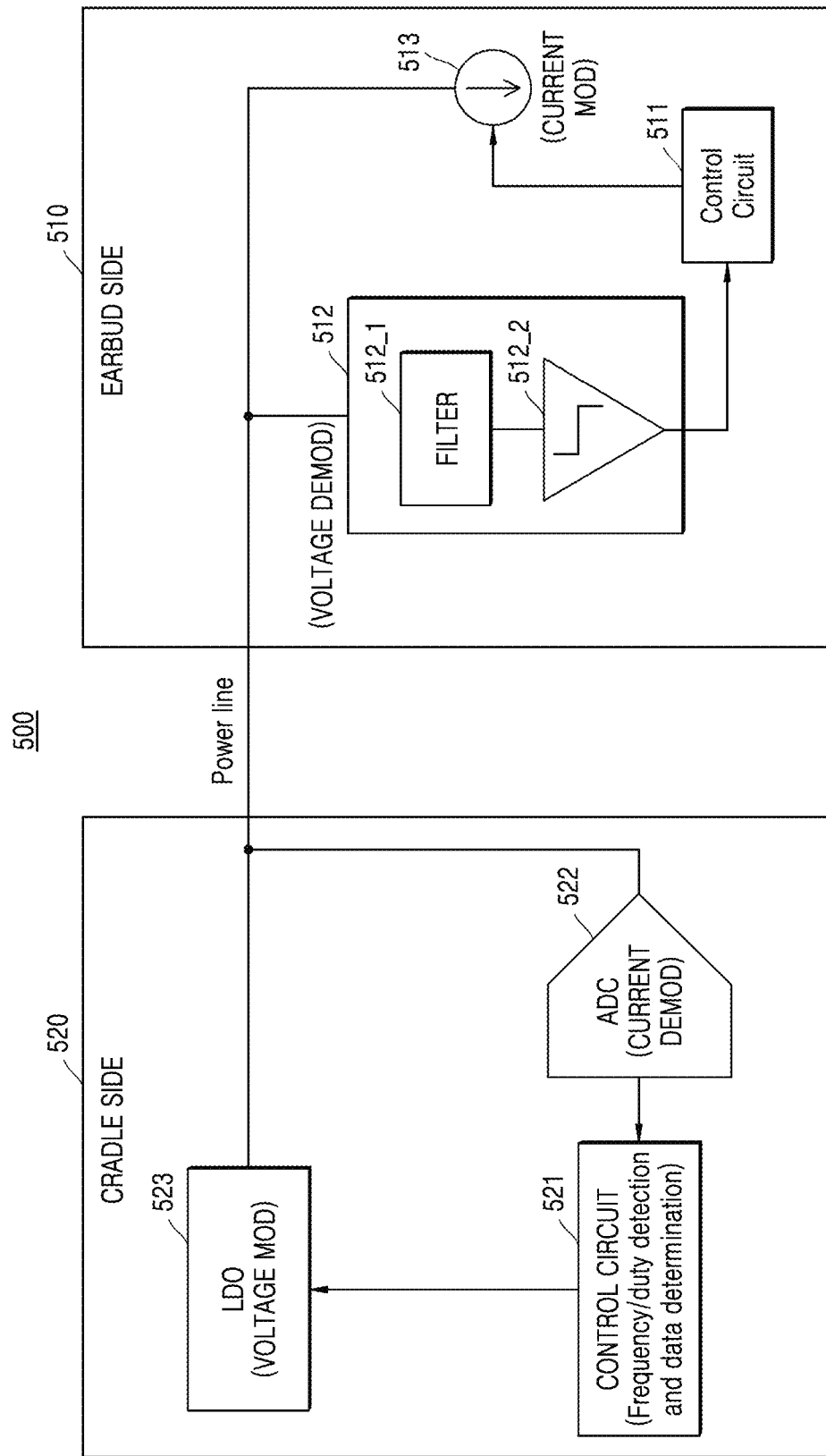
FIG. 15 is a diagram illustrating an implementation example of a configuration associated with detecting a frequency and a duty ratio of a preamble signal.

FIG. 15 is a diagram illustrating an implementation example of a configuration associated with detecting a frequency and a duty ratio of a preamble signal.

Referring to FIG. 15, a mobile system 500 according to example embodiments may include a first mobile device 510 and a second mobile device 520. According to an implementation example, the first mobile device 510 may include a control circuit 511, a voltage demodulator 512, and/or a current modulator 513, and the voltage demodulator 512 may include a filter 512_1 and/or an amplifier 512_2. Also, the current modulator 513 may include a current source.

Also, the second mobile device 520 may include a control circuit 521, a current demodulator 522, and/or a voltage modulator 523, and the voltage modulator 523 may include an LDO regulator. Also, the current demodulator 522 may include an analog-to-digital converter (ADC).

The first mobile device 510 and the second mobile device 520 may transmit and receive a preamble signal therebetween before transmitting data. A period, where the preamble signal is transmitted, may be referred to as a preamble period. The preamble signal may be toggled at least once, and based on detecting a toggling width (or a width of a certain logic state) of the preamble signal, a duty ratio of the preamble signal may be detected. The preamble period may be a period corresponding to at least one of the PLC device check operation 320 and the PLC-based communication and charge operation 350 of FIG. 3.

The first mobile device 510 may receive a voltage signal as a preamble signal and data, and the second mobile device 520 may receive a current signal as a preamble signal and data. In example embodiments, before transmitting data, the second mobile device 520 may transmit at least one preamble signal to the first mobile device 510 in the preamble period. The second mobile device 520 may transmit data to the first mobile device 510 on the basis of a frequency and a duty ratio of a preamble signal which is transmitted in the preamble period, and for example, the second mobile device 520 may transmit data, having the same frequency (or period) and duty ratio as those of the preamble signal, to the first mobile device 510. In a case where the second mobile device 520 transmits a voltage signal as data, the voltage demodulator 512 of the first mobile device 510 may generate an internal signal having a logic high level or a logic low level through a voltage demodulation operation on the basis of the voltage signal received thereby, and the control circuit 511 of the first mobile device 510 may determine data on the basis of a predetermined or alternatively, desired frequency and duty ratio corresponding to the internal signal.

The first mobile device 510 may transmit data to the second mobile device 520, and for example, may transmit a current signal to the second mobile device 520 through a power line on the basis of a current modulation operation. Also, like the example embodiments described above, in the preamble period, the first mobile device 510 may transmit a current signal or a voltage signal as a preamble signal to the second mobile device 520, and the control circuit 521 of the second mobile device 520 may detect a frequency and a duty ratio of the preamble signal from the first mobile device 510. Subsequently, the first mobile device 510 may transmit a current signal as data to the second mobile device 520, and the second mobile device 520 may determine the data on the basis of a frequency and a duty ratio each detected in the preamble period.

In an operation of the first mobile device 510, the filter 512_1 of the voltage demodulator 512 may perform a filtering operation of cutting off a certain level of a voltage signal received through the power line to remove noise and may provide a filtered voltage signal to the amplifier 512_2. The amplifier 512_2 may process the voltage signal received thereby to generate an internal signal having a logic high level or a logic low level and may provide the internal signal to the control circuit 511, and the control circuit 511 may perform a data determination operation using the internal signal on the basis of a frequency and duty ratio detection result. Also, the control circuit 511 may control the current modulator 513 to generate a current signal for data communication.

In an operation of the second mobile device 520, the current demodulator 522 may provide an internal signal having a logic high level or a logic low level to the control circuit 521 on the basis of an analog-to-digital conversion operation performed on the current signal received thereby, and the control circuit 521 may perform a data determination operation based on a frequency and a duty ratio each detected in the preamble period. Also, the control circuit 521 may control the voltage modulator 523, and thus, may generate a voltage signal for data communication according to the example embodiments described above.

One or more of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to example embodiments thereof, it will be understood that various changes in form and details may be made therein without departing from the spirit and scope of the following claims.

What is claimed is:

1. A mobile system comprising:
a first mobile device configured to output a signal having a level less than or equal to a reference level on the basis of a charged state of a battery in the first mobile device; and
a second mobile device configured to receive the signal and to selectively provide power to the first mobile device on the basis of a duration time for which reception of the signal having the level less than or equal to the reference level is maintained and a toggle time for which the signal is toggled.

2. The mobile system of claim 1, wherein;
if the duration time is longer than a first reference time, the second mobile device is configured to cut off power provided to the first mobile device; and
if the toggle time is longer than a second reference time, the second mobile device is configured to provide power to the first mobile device.

3. The mobile system of claim 2, wherein the first mobile device comprises:
a protection circuit module configured to, when a charged voltage of the battery drops below a reference voltage, perform an over-discharge protection function; and
a first power management integrated circuit configured to output a toggled signal before the charged voltage of the battery increases to be greater than or equal to the reference voltage.

4. The mobile system of claim 3, wherein the first reference time is longer than a time taken until the charged voltage reaches the reference voltage from a time at which charging of the battery starts.

5. The mobile system of claim 4, wherein the first mobile device comprises a first power line communication (PLC) module configured to perform PLC-based communication with the second mobile device,
the second mobile device comprises a second PLC module configured to perform the PLC-based communication with the second mobile device, and
the first mobile device and the second mobile device are each configured to perform the PLC-based communication after the first reference time elapses.

6. The mobile system of claim 3, wherein the second reference time is longer than a time for which the signal is toggled by an external impact.

7. The mobile system of claim 1, wherein the second mobile device comprises:
a connection terminal electrically connected to the first mobile device;
a second power management integrated circuit configured to generate power to be provided to the first mobile device; and
a control circuit configured to control the second power management integrated circuit so that the power generated by the second power management integrated circuit is provided to the first mobile device based on the duration time and the toggle time.

8. The mobile system of claim 7, wherein the control circuit comprises:
a low current sensor configured to first compare the duration time with a first reference time and to output a low current sense signal on the basis of a result of the first comparison;
a toggle sensor configured to second compare the toggle time with a second reference time and to output a toggle sense signal on the basis of a result of the second comparison; and
a power transmission controller configured to output a power transmission signal to the second power management integrated circuit so that the power is provided to the second mobile device based on the low current sense signal and the toggle sense signal.

9. The mobile system of claim 1, wherein the reference level is a level obtained by multiplying a discharge rate of the battery by a threshold rate.

10. The mobile system of claim 1, wherein the first mobile device comprises an earbud, and the second mobile device comprises an earbud charger.

11. A mobile device comprising:
a connection terminal configured to receive a signal from an external device including a battery;
a power management integrated circuit configured to generate power to be provided to the external device; and
a control circuit configured to control the power management integrated circuit so that the power is provided to the external device based on a duration time for which a level of the signal is maintained to be less than or equal to a reference level and a toggle time for which the signal is toggled.

12. The mobile device of claim 11, wherein, if the duration time is longer than a first reference time, the control circuit is configured to cut off power provided to the external device, and
if the toggle time is longer than a second reference time, the control circuit is configured to provide power to the external device.

13. The mobile device of claim 12, wherein the control circuit comprises:
a low current sensor configured to first compare the duration time with a first reference time and to output a low current sense signal on the basis of a result of the first comparison;

a toggle sensor configured to second compare the toggle time with a second reference time and to output a toggle sense signal on the basis of a result of the second comparison; and a power transmission controller configured to output a power transmission signal to the power management integrated circuit so that the power is provided to the external device based on the low current sense signal and the toggle sense signal.

14. The mobile device of claim 13, wherein the first reference time is longer than a time taken until a voltage of the battery reaches a reference voltage, so that an over-discharge protection function performed on the battery to starts from a time at which charging of the battery starts.

15. The mobile device of claim 13, wherein the second reference time is longer than a time for which the signal is toggled by an external impact.

16. An operating method of a mobile device capable of providing power to an external device including a battery, the operating method comprising:

receiving, from the external device, a signal having a level less than or equal to or a reference level; and selectively providing power to the external device on the basis of a duration time for which reception of the signal having the level less than or equal to the reference level is maintained and a toggle time for which the signal is toggled.

17. The operating method of claim 16, wherein the selectively providing power to the external device comprises:

comparing the duration time with a first reference time; and cutting off the power provided to the external device on the basis of the signal of which the duration time is longer than the first reference time.

18. The operating method of claim 17, wherein the first reference time is longer than a time taken until a charged voltage of the battery reaches a reference voltage, so that an over-discharge protection function performed on the battery starts from a time at which charging of the battery starts.

19. The operating method of claim 16, wherein the selectively providing power to the external device comprises:

comparing the duration time with a second reference time; and providing the power to the external device on the basis of the signal of which the toggle time is longer than the second reference time.

20. The operating method of claim 16, wherein the reference level is a level obtained by multiplying a discharge rate of the battery by a threshold rate.

* * * * *